United States Patent [19]

Grist

[11] 4,322,602
[45] Mar. 30, 1982

[54] SQUARE WAVE POWER SUPPLY FOR ARC WELDING

[75] Inventor: Franklin J. Grist, Appleton, Wis.

[73] Assignee: Miller Electric Manufacturing Company, Appleton, Wis.

[21] Appl. No.: 227,910

[22] Filed: Jan. 23, 1981

[51] Int. Cl.³ .............................................. B23K 9/09
[52] U.S. Cl. ........................... 219/130.33; 219/130.51
[58] Field of Search ....................... 219/130.51, 130.33

[56] References Cited

U.S. PATENT DOCUMENTS 3,364,334  1/1968  Sato et al. ...................... 219/130.51
4,038,515  7/1977  Risberg .......................... 219/130.33

Primary Examiner—C. C. Shaw
Attorney, Agent, or Firm—Sughrue, Mion, Zinn, Macpeak & Seas

[57] ABSTRACT

An alternating current constant potential power source suitable for use in a submerged arc welding process. An inductor (Z1) of large value is placed in the D.C. output of thyristor bridge (SCR1 to SCR4) fed from a transformer (T1). The four thyristors (SCR1 to SCR4) and the inductor (Z1) are controlled in such a manner as to provide essentially square wave currents. The square wave is adjustable in amplitude with very rapid zero crossing. The thyristor bridge (SCR1 to SCR4) is controlled in a firing sequence so as to prevent free wheeling of the square wave inductor (Z1) at polarity reversals of the voltage supply. The inductor (Z1) is capable of storing vast amounts of energy, and the thyristor firings are timed to deliver this energy into the arc. Two regulating sub-systems respectively responsive to arc voltage and arc current operate together to control the output. The regulator time response is designed to ignore short instantaneous perturbations and regulate around a long term output voltage with high gain. This voltage loop is active at all times. However, defeating the current feedback on arc starts permits the source to deliver high current on demand during cold starts.

10 Claims, 4 Drawing Figures

SQUARE WAVE POWER SUPPLY FOR ARC WELDING

FIELD OF THE INVENTION

This invention pertains to electric arc welding of heavy-section ferrous metals, particularly by means of the "submerged" arc welding process where the arc is run under a cover of granulated welding flux material.

BACKGROUND OF THE INVENTION

Submerged arc welding is enjoying a resurgence in popularity now that there is a greater awareness of safety considerations concerning fumes and arc flash. Direct current is most often used as the power source. The original D.C. automatic submerged arc welding applications utilized drooping power sources with voltage-following wire electrode feeders. It was not long before constant potential D.C. sources were introduced to the process, linked to constant speed wire electrode feeders.

Ferrous materials, most commonly steel, are magnetic, and because of this, D.C. welding is often not satisfactory. The magnetic field generated by the arc current and surrounding the arc and the fields associated with the ground currents react with each other in an unpredictable manner. The result is often referred to as "arc blow". This effect is most objectionable in deep groove welds where erratic movement of the arc disturbs proper formation and placement of the weld puddle.

When arc blow became a problem, users reverted to A.C. power, but common sine wave A.C. does not perform well in the submerged arc welding process. The submerged arc welding process typically runs at 24 to 38 volts. Using an A.C. trasformer type power source with these low voltages causes the arc to "stumble" and extinguish and then fail to re-ignite. This is because the sine wave A.C. exhibits a slow "crossover" where the voltage is a low or zero 120 times per second. It is during these times that the arc goes out, and then the wire must advance until it strikes the puddle again to begin re-ignition. This is not a good, stable arc condition.

An alternative way to use A.C. power has been with "drooper" supplies. These are typically 80 volts open circuit and designed with transformers of high leakage construction. They are basically constant-current sources with the running voltage established by the load, not by the power source. To use such a current source with the submerged arc process requires employment of a "voltage-following" wire feeder. The speed of this wire feeder is dependent upon the arc voltage, the feeder motor being driven by the secondary voltage. This type of wire feeder has not been widely used in A.C. welding because welding stability is difficult to obtain and hold. Current, voltage, and wire feed rate all interact with each other in an unpredictable manner, and the system is thus not stable and self-regulating. Moreover, starting current is very limited with drooper A.C. sources resulting in arc starts of marginal quality.

The present invention applies a square wave A.C. power source to the submerged arc welding process. The square wave has a very rapid crossover transition at polarity reversal, and thus the arc does not extinguish each half cycle. As a result, the wire does not need to advance, strike the workpiece, ignite a new arc and burn back 120 times per second.

Square wave arc welding power supplies are known in the prior art. One example is shown in U.S. Pat. No. 3,364,334 to Sato. This patent shows a diode bridge added in series with the A.C. line, and an inductor is connected across the D.C. terminals of the bridge. In this arrangement, the bridge is not the control element, and the welding current control must be provided on the A.C. line. In addition, the diodes of the bridge form a free wheeling path at all times.

In U.S. Pat. No. 4,038,515 to Risberg, the diodes and the bridge are replaced by thyristors. The actual welding current is compared with the desired weld current setting, and a firing control circuit responds to the resulting error signal to fire the thyristor bridge with proper phasing to supply a constant current to the load. This system cannot be used with a constant speed wire feeder. Therefore, the Risberg system could not be used in the submerged arc welding process unless it were tied to a variable speed wire feeder. The use of a variable speed voltage following wire feeder is not, however, a satisfactory solution because, as previously mentioned, cold starts are difficult, and any disturbance of the current or voltage would cause the voltage following wire feeder to react and interact with the arc in such a way as to become at least momentarily unstable.

What is needed is a constant current A.C. power source, controlled in a constant voltage mode, which can be matched with a constant speed wire electrode feeder, thus gaining the various advantages which have become familiar in D.C. automatic welding applications.

SUMMARY OF THE INVENTION

It is therefore an object of the invention to provide an A.C. constant potential power source which can be matched with a constant speed wire feeder in a submerged arc welding process.

Another object of the invention is to provide an A.C. power source which performs well in deep groove submerged arc welding applications involving heavy-section ferrous metals.

A further object of the invention is to provide a method and apparatus for holding a constant voltage at the weld output terminals no matter what current the arc demands.

In a specific embodiment of the present invention, the main power transformer converts the primary 480 volt single-phase input power to a secondary open circuit voltage of 92 volts at 60 Hz and provides various control, synchronizing and auxiliary voltages for the system printed circuit board and accessory loads. Four thyristors and a memory core inductor are controlled in such a manner as to provide essentially square wave current. The square wave is adjustable in amplitude with very rapid zero crossings. The transition time is in the range of 80 to 150 microseconds which is many times faster than sine wave reversal time. The thyristor bridge is controlled in a firing sequence so as to prevent free wheeling of the square wave inductor at polarity reversals of the voltage supply. The inductor is capable of storing vast amounts of energy in the form of flu, integrated from applied voltage-seconds. The thyristor firings are timed to deliver this energy into the arc, inducing voltage equal to the instantaneous voltage of the utility supply at that point in time, even though the average arc voltage may be considerably lower.

It is this ability to generate high re-striking voltages with a basically low voltage regulated source that permits running constant potential mode submerged arc welding with alternating current. Two regulating subsystems operate together to control the output:

1. A voltage control loop monitors the arc voltage at the terminals or from remote sensing leads to produce a signal which is processed and sent to the voltage regulator for comparison with the reference signal as set by the welding operator. An actuating error triggers a correction signal to bring the arc voltage back to the set value within the designed tolerance range.

2. A second control loop, utilizing current feedback, obtains its information from a Hall device sensing arc current. The signal produced by the Hall device is processed so as to minimize low frequency hunting in the load. Transiently coupled negative feedback with a 45 Hz rolloff is fed back to the voltage regulator after further processing through a dynamic slope control. This takes the form of a potentiometer which gives the welding operator some degree of control over the arc stiffness and response.

The regulator's time response is designed to ignore short instantaneous perturbations and to regulate around a long term output voltage with high grain. This voltage loop is active at all times. Defeating the current feedback during arc starts for approximately 50 milliseconds permits the source to deliver several thousand amperes on demand during cold starts.

BRIEF DESCRIPTION OF THE DRAWINGS

The foregoing objects, aspects and advantages of the invention will be better understood with reference to the following detailed description of the invention taken together with the drawings, in which.

DETAILED DESCRIPTION OF THE PREFERRED EMBODIMENT

An input power supply source of 460 volts at 60 Hz is applied to the primary of transformer T1 which produces 92 open circuit volts across its secondary. Connected across the secondary of the transformer T1 is a thyristor bridge comprising thyristors SCR1, SCR2, SCR3, and SCR4. A square wave inductor Z1 is connected across the D.C. output of the thyristor bridge. The load between the electrode and the work appears in one side of the A.C. feed to the thyristor bridge. Hall device HD1 measures the average D.C. current. The ammeter A connected to the Hall device amplifier HA1 interprets the output current as the average A.C. current, but by properly graduating the scale of the ammeter, readings representing r.m.s. A.C. current can be obtained. The signal derived from the Hall device HD1 is a D.C. voltage of approximately 50 millivolts at 1000 amperes. This signal is amplified by the Hall device operational amplifier HA1 to provide a high level signal to be used as transient negative feedback at the main control board PC1.

The inductor Z1 is very large with an extremely wide air gap. It has a great ability to store energy in the form of flux. D.C. current equivalent to the arc current flows through the turns of the inductor Z1. During times when the secondary voltage of transformer T1 is higher than the arc voltage, current is increasing through inductor Z1, and the flux is building. When the secondary voltage falls below the arc voltage, the flux field in inductor Z1 collapses, and it becomes a generator. During this time, it bucks the power supplied to the primary of transformer T1. Thus, when the system is operating at midrange, there is a nearly constant D.C. current through inductor Z1, but the thyristor switches SCR1, SCR2, SCR3 and SCR4 are switched in a square wave fashion.

Figure 1A:
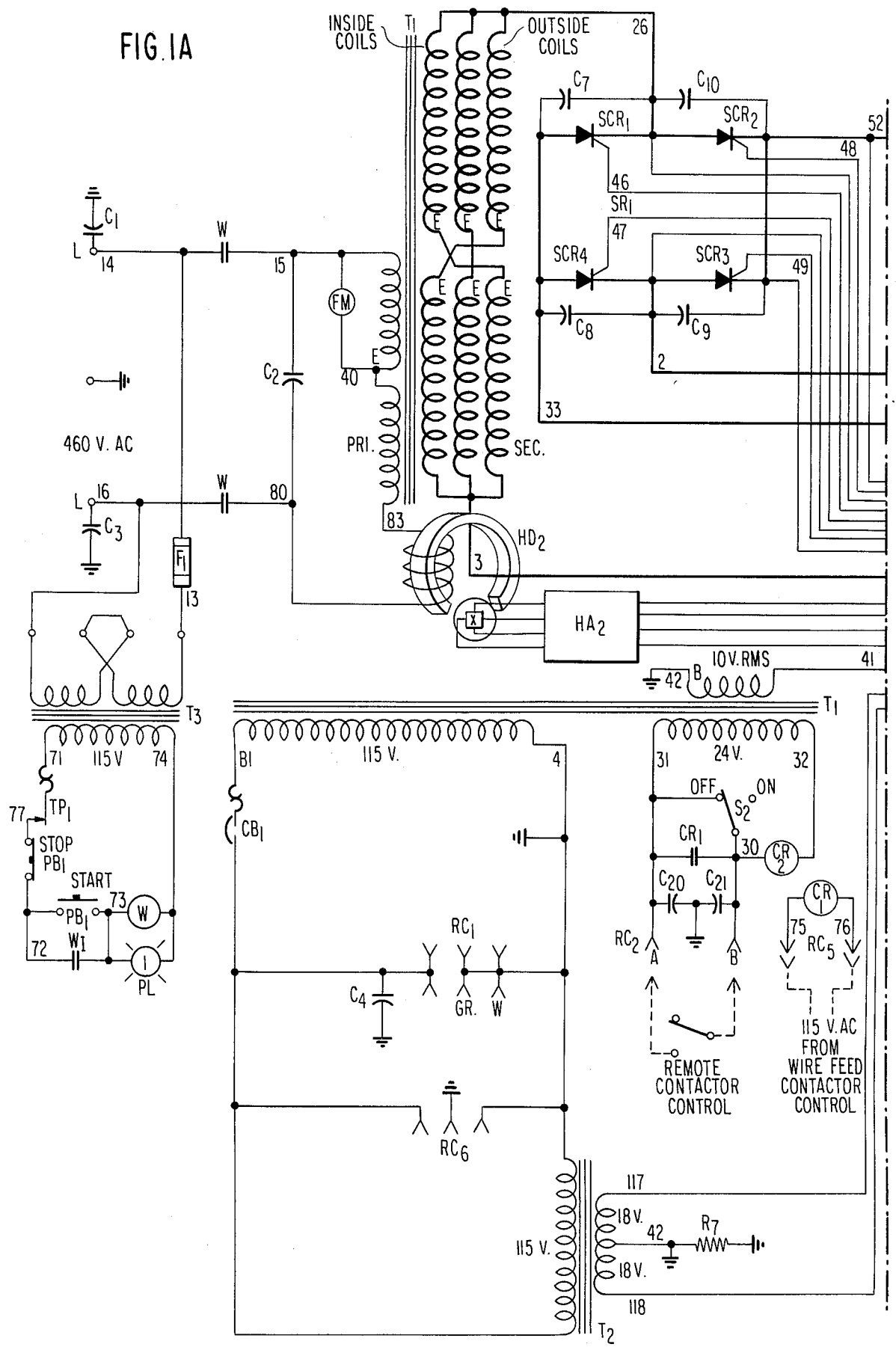
FIG. 1A and 1B is a schematic and block diagram of a specific embodiment of a constant potential square-wave power supply for submerged arc welding according to the present invention.
Figure 1B:
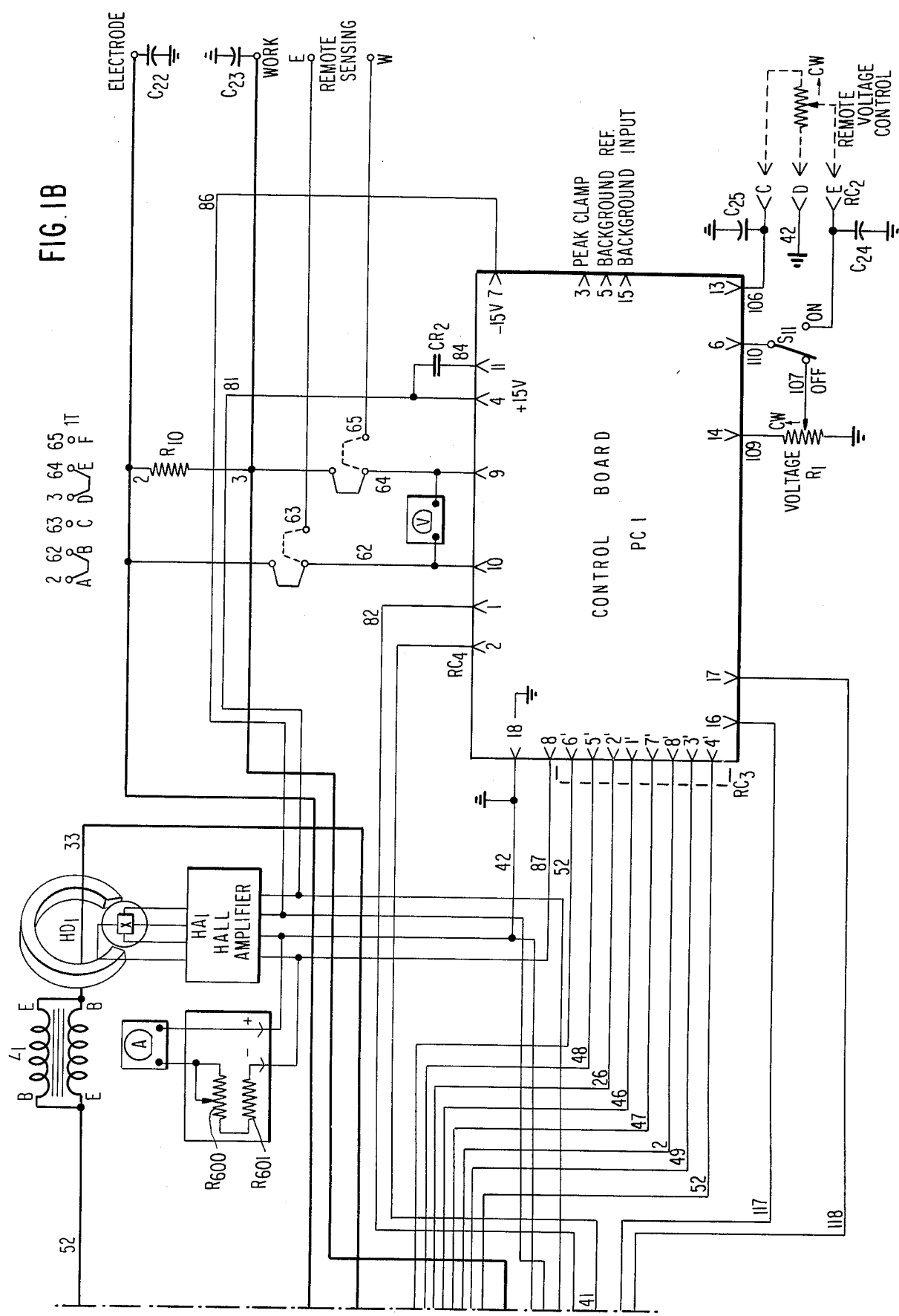

Assume that the inductor Z1 is already carrying 100 amperes D.C., the arc load is 100 amperes A.C., SCR2 and SCR4 are conducting, and SCR1 and SCR3 are off. The voltage across inductor Z1 is plus on the left as seen in FIG. 1 and minus on the right. The secondary voltage of T1 is higher than the arc voltage. The current in inductor Z1 is building towards 105 amperes. Now the line voltage reaches its crest and begins downward. The secondary voltage, however, is still higher than the arc voltage, although the difference is less. The current in inductor Z1 continues to increase but at a slower rate. When the secondary voltage falls below the arc voltage, inductor Z1 changes from a voltage sink to a voltage generator. Now, plus is on the right and negative is on the left, of inductor Z1 as viewed in FIG. 1. The collapsing field of inductor Z1 generates a voltage which continues to force current through thyristor SCR4, the load, and thyristor SCR2. The potential generated by inductor Z1 bucks the secondary voltage after this time. This situation can continue for a few extra degrees, and the larger the storing ability of inductor Z1, the longer the half cycle can be stretched. When it is time to reverse polarity, thyristors SCR1 and SCR3 are fired simultaneously. All four thyristors are on at this point in time. The A.C. secondary current builds up very quickly. The secondary voltage then back-biases thyristors SCR2 and SCR4, commutating them off. This is the "polarity reversal through zero" transition time and occurs in something between 50 and 150 microseconds. Thyristors SCR1 and SCR3 are now on, and there are no free-wheeling paths. The current flows through the load in the opposite direction, but through the inductor Z1 in the same direction. Beyond the crest of the square wave, near the trailing edge, the energy to the arc is provided with the energy previously stored in the inductor Z1 in the form of flux integrated from applied volt-seconds.

Thus, upon command to reverse the polarity, a relatively constant current is flowing in inductor Z1, and in approximately 80 microseconds, the flow of that same current into the load is reversed. This constant current pump creates a powerful tenacity at the arc, since inductor Z1 resists fall-off of its current and will generate high voltages to re-ignite the arc at the first threat of extinction. It is this ability to generate high restriking voltage on demand only by means of self-induced emf with a regulated low voltage source that permits constant potential mode submerged arc welding using alternating current without fear of arc extinction. The square wave A.C. current is produced from a very inductive current source, but the terminal output is tightly voltage regulated. Were the large inductor Z1 simply inserted in the A.C. path, as a control element, the voltage drop across it would be prohibitively high.

A current increase is obtained by advancing the thyristor firing points in time. If their relationship to each other remains the same, only the current will increase. Conversely, an average current decrease is obtained by retarding the thyristor firing points in time. Phase reference for establishing these firing points is provided by the 10 volt r.m.s. "sync" winding on transformer T1 via wires 41 and 42, the latter being connected to logic ground. The sync signal on line 41 follows the line voltage.

Figure 2A:
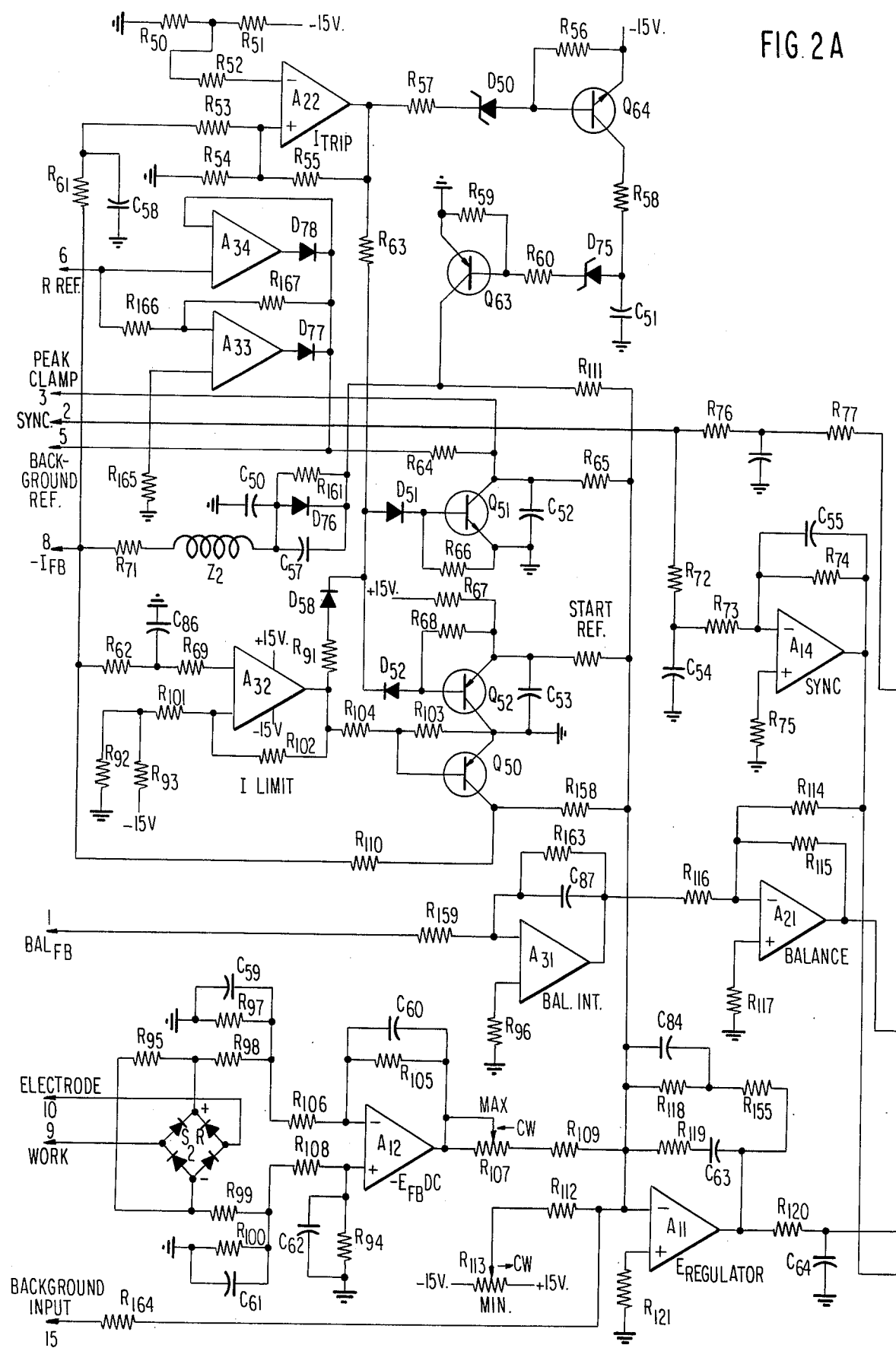
FIG. 2A and 2B is a detailed schematic and block diagram of the control circuitry shown in block diagram form in FIG. 1.
Figure 2B:
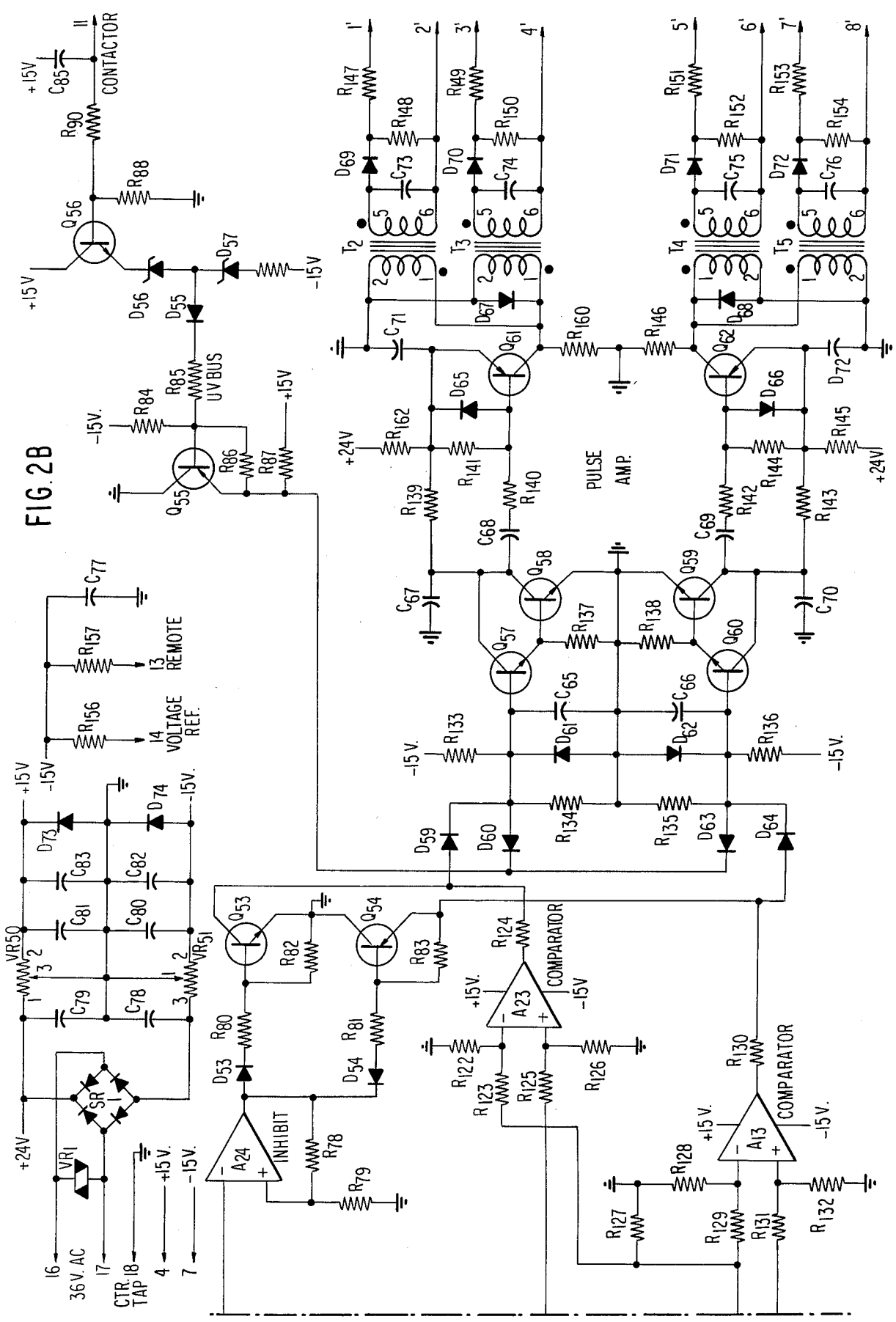

Hall device HD2 is located in the A.C. primary and secondary circuits. Its purpose is to keep the square wave in balance. A dissimilarity in the half-cycle current amplitudes results in a D.C. component in the main transformer T1 secondary. This tends to saturate the iron, causing the primary line draw to go up. Hall device HD2 is wound with one turn of secondary, counteracted by four turns of primary current wound in the opposing direction. Since the primary to secondary turns ratio is 5:1, the flux produced in Hall device HD2 will be low if the primary and secondary currents are equal and thus cancel. If the primary and the secondary currents are not equal and therefore do not cancel, the resulting flux will generate a signal in the Hall device HD2 which is amplified by operational amplifier HA2 and is sent to the control board PC1. The output of amplifier HA2 exhibits a 2 volt peak square wave signal if the power supply output is at 1000 amperes balanced. This represents a 200 ampere difference because of the disparity between the primary four turns and the secondary single turn on the Hall device HD2. This signal at the control board PC1 is integrated with a balanced integrator amplifier A31 and capacitor C87 shown in FIG. 2. Thus, there is always a signal at the output of amplifier A31 going through resistor R116 to the input of balance amplifier A21. This signal will vary in amplitude in a direction which will oppose imbalance. The correction is made in a time domain; that is, should the positive half cycle current integration appear larger than the negative half cycle, then the system will narrow the positive half cycle "on" time to compensate, but no attempt is made to adjust the amplitude. The purpose of this is to prevent transformer core saturation over a long term which would result in primary coil heating. This can happen through ratcheting; that is, a little bit of imbalance each positive half cycle would ratchet the core up into positive saturation if there were load imbalance due to load rectification or the like. Were it not for this imbalance correcting system, the symptom of transformer saturation would be a spike of primary current amplitude late in the offending half cycle. The result is an apparent increase in the primary line draw. If the volt-seconds applied during the two half cycles are unequal, for instance if the positive half cycle applies more volt-seconds to the transformer than the negative half cycle, then the transformer core will move in the positive saturation direction. On the opposite or negative half cycle, the core will not fully reset due to the lowered volt-seconds supplied to the primary during that half cycle. The primary current spike which results from transformer saturation will appear near the end of the narrow current half cycle.

The larger half cycle will result in less volt-seconds supplied to the primary due to the drop induced by line impedance. There is a notching effect when the thyristors fire, caused by secondary impedance droop reducing the primary volt-seconds for the balance of that current half cycle. On the following opposite half current cycle, less voltage will be dropped in the line impedance, resulting in higher volt-seconds applied during that half current cycle which drives the core into saturation. Suppose that the transformer core normally operates up to 10 kilogauss on each half cycle under a balanced condition. Now suppose that the arc rectifies slightly, and on one particular half cycle there is a heavier load. The secondary impedance causes some droop. Primary volt-seconds applied to that half cycle is slightly less so that the flux only goes to, say, 9 kilogauss. Now in the next half cycle there is a lighter load; therefore, less current is drawn, and the secondary impedance inserts less droop so that the voltage applied to the transformer is greater. This pushes the flux density to 11 kilogauss. Repeating the cycle back to the heavily loaded half cycle, the secondry impedance again causes droop because of the high line draw; therefore, the voltage in falling off applies less volt-seconds to the turns-core product, and now it only goes to 8 kilogauss. On the subsequent lightly loaded half cycle, it will go to 12 kilogauss, and so on, until very high saturation is reached, and the current draw goes very high.

The "balance" closed loop feedback system employing the Hall device HD2 automatically adjusts the width of the alternate half cycles to compensate for accummulated mismatch in primary current draw on alternate half cycles. Its response time is approximately 1.5 seconds.

The value of inductor Z1 is a carefully selected compromise. It must be large enough in inductance to provide a reasonably square wave shape without excessive "humping" at 1000 amperes. It must be small enough on the other hand so as not to limit the rate of current rise appreciably at arc start. Too large an inductor slows current buildup from a cold short circuit even with programmed phase advance at the regulator operational amplifier. For most wires, and especially the larger diameters, fast rise to 400 amperes or more is absolutely necessary to assure a good arc start. The slightest hesitation in the establishment of the arc at wire advance will cause stumbling. Cutting off the electrode wire at an angle helps only marginally.

The thyristor bridge is really a steering device. The full wave rectified A.C. current flows through the inductor Z1 which is connected in series with the A.C. arc load. The Hall device HD1 is located in this D.C. path because it can produce a useful signal representing the output A.C. current with complete isolation. Furthermore, there is no need to rectify an A.C. signal to feed the ammeter or the control board PC1, both of which require D.C. The thyristor bridge rectifier is thus a switching device which, when fired in the proper sequence and in conjunction with the square wave inductor Z1, forms the heart of the square wave system.

Referring again to FIG. 2, the sync signal is inputted through pins 2 and 18, the latter being logic ground. Logic ground is isolated from the frame or earth ground by the 1 megohm resistor R7 shown in FIG. 1. This is to provide a high impedance path to logic common for high frequency energy and low leakage current from the voltage sensing leads connected to pins 9 and 10. The reference signal is inputted at pin 5. It is a steady state D.C. signal of a 3.85 positive voltage derived from the on-board regulated +15 V logic power supply through resistor R156. The reference adjustment is through potentiometer R1 shown in FIG. 1. The wiper of potentiometer R1 is connected through switch S11 to pin 6 of the control board. The purpose of switch S11 is to provide for a remote voltage control in those applications which require it. In either case, the voltage at pin 6 is supplied to a pir of operational amplifiers A33 and A34 shown in FIG. 2. These amplifiers provide a regulated background reference voltage at pin 5.

A current feedback signal of 2.5 volts negative enters the board at pin 8 from Hall device amplifier HA1 via wire 87. Resistor R71 sets the negative feedback current. Inductor Z2 and capacitor C50 form an integrating filter with an upper roll off of about 45 Hz. Capacitor C57 passes only the A.C. components of the negative current feedback signal to the regulator through resistor R111. This makes the resulting "slope" of the machine dynamic only, where the low frequency current changes are suppressed. There is a high impedance route, however, through resistors R110 and R158 to the regulator amplifier A11 summing junction. This contribution is normally shorted out by transistor Q50. In the event of a high overload current due to an output short, transistor Q50 ungrounds the negative current feedback signal, allowing gross amounts of current feedback to "hold back" the output current to a safe value.

A current feedback signal passes through resistors R62 and R69 to the current limit operational amplifier A32. Capacitor C86 integrates noise out and provides a delay permitting short time current excursion to pass. Resistors R92 and R93 establish the reference with which the negative current feedback signal is compared. Resistor R102 provides a hysteresis which resets transistor Q50 when the output short is opened. The operational amplifier A32 current limit output drives transistors Q50, Q51 and Q52. If the current exceeds the set level, transistor Q51 is turned on through resistor R91 and the diodes D58 and D51 shorting out the voltage reference coming in through pin 5.

There is also a "current trip" operational amplifier A22 driven by the negative current feedback through resistor R61. Capacitor C58 integrates the higher frequency components out of the signal prior to its injection through resistor R53. Resistors R50 and R51 set the trip point reference voltage. Resistor R55 provides hysteresis so that any overcurrent must return to an acceptably low level before the trip is released. The negative over current signal at the output of amplifier A22 is used in two ways:

1. The signal is sent through resistor R63 and turns on transistor Q52, thereby grounding out the +15 V start reference voltage which is applied through resistors R67 and R70 to the regulator amplifier A11. Prior to arc starts, the +V reference is grounded through resistor R64 and transistor Q51. A high start reference is applied through resistors R67 and R70 to the regulator amplifier A11. After start, transistor Q51 releases and transistors Q52 grounds out the start reference. A delay of 50 milliseconds is provided by capacitor C58 and resistor R61.

2. With operational amplifier A22 output normally positive, Zener diode D50 is "on", driving transistors Q64 and Q63 "on". This puts −15 volts on capacitor C51 which then charges negatively. As soon as any arc current is drawn, amplifier A22 output goes to negative saturation and turns off transistor Q64. After a delay caused by resistors R59 and R60, diode D75 and the discharge of capacitor C51, transistor Q63 turns off, thereby ungrounding the current feedback. This is the "start" time which makes virtually unlimited currents available for wire burn-off by defeating current feedback briefly. Approximately 50 milliseconds delay is provided by capacitor C58 and resistor R61, and another 50 milliseconds is provided by the capacitor C51 and transistor Q63 network.

Voltage regulation is, of course, the most important of the control loops. The reference is brought in at pin 5 through resistors R64 and R65 to amplifier A11. There is a minimum voltage set by trimmer potentiometer R113 and injected through resistor R112. Voltages across electrode and work pickup points are brought in through pins 10 and 9, respectively, where they are rectified by diode bridge SR2, and the resulting full wave D.C. signal is loaded by resistor R59. Resistors R98, R97, R99, and R100 divide the 80 volts down to a more useable lower value. Capacitors C59 and C61 integrate out the higher frequency components of the voltage feedback signal. The lowered voltage feedback signal is impressed on the input of a differential amplifier A12 through resistors R106 and R108. Capacitor C60 integrates out some of the ripple and arc noise. The negative signal through the trimmer potentiometer R107 is used to calibrate the machine's maximum output voltage. Thus, the positive reference voltage and the negative voltage feedback signal are supplied to the regulator operational amplifier A11. Any difference between the two voltages is interpreted as an error and is amplified. The gain of this amplification by amplifier A11 is determined by the D.C. gain resistors R118 and R155 in series. The A.C. gain of the regulator amplifier A11 is set by the capacitor C63 (lag) and resistor R119 (lead) in series. The combination of capacitor C84 and resistor R155 also contributes the A.C. gain and frequency response. Resistor R118 provides a high D.C. gain, and capacitor C84 rolls off the response thereof. These components are critical and important to proper response to the submerged arc welding process. The submerged arc puddle often displays a "natural" frequency due to wave action at about 10 to 12 Hz. If this "resonance is not accounted for, it can be accentuated by improper regulator frequency response, resulting in a sympathetic control "beat". Total system response is approximately 20 milliseconds in the increasing direction and 10 milliseconds in the decreasing direction.

The comparator amplifiers A23 and A13 take the output signal from the regulator amplifier A11 through resistor R120 and filtering capacitor C64, and each makes a comparison with the sync signal derived from sync amplifier A14. Resistor R72 and capacitor C54 provide integration. Capacitor C55 and resistor R73 establish an integration delay to inject further phase shift. Resistor R74 sets the D.C. gain. The output of a sync amplifier A14 is a sine wave signal representing the line voltage, but at approximately 10 volts peak and leading the sync signal at pin 2 by about 30 degrees and inverted. As each comparator A23 and A13 sees this sync signal cross the regulator A11 output signal, it switches. In switching, a comparator provides a positive sharp rising D.C. voltage through resistor R124 or R130 and diodes D59 or D64 to the pulse channels.

Transistors Q57 and Q58 are simple amplifiers while capacitor C68 and resistor R141 differentiate the pulse output. Transistor Q61 derives the pulse transformers T2 and T3. Diode D67 free wheels the primary current. Capacitor C71 stores charge provided through resistor R162 and dumps it into the primaries of the transformers T2 and T3 on command. The pulse can be let through or grounded to common by means of the "solid state contactor" at pin 11. A closure here brings +15 V into transistor Q56, turning it on. Zener diodes D56 and D57 require that the logic power supply +15 V be up and stabilized before transistor Q55 can be turned off. Transistor Q55 comes up in the "on" state at power-up due to resistor R84, thereby shorting to common any pulses in the pulse train at diodes D60 and D63.

The inhibit amplifier A24 uses a delayed sync signal to ground out the pulses at resistors R124 and R130. This assures that the thyristors cannot be fired too far advanced where the SCR anode voltages might be negative. Upon release of the inhibit short, a pulse is formed and passes through the thyristor gate if the regulator attempts to advance the phase angle too far forward. Also, if the thyristor were gated too far advanced, the thyristor would free wheel around inductor Z1, and the load current would become discontinuous because the load voltage would be higher than the source voltage. This situation would continue until the difference between the line and load voltages was sufficient to re-establish arc current.

Balance detector Hall device amplifier HA2 sends a square wave A.C. signal of approximately 2 volts peak to peak into pin 1. The balance integrator operational amplifier A31 processes this signal as described earlier. The output of amplifier A31 will be positive or negative D.C. if the incoming wave form is unbalanced in weld time and/or amplitude. If the system is in balance, the output of amplifier A31 is near zero. The output of amplifier A31 goes to balance amplifier A21. The purpose of amplifier 21 is to shift the zero reference line of the sync signal from resistor R114 with respect to logic common. In so doing, it can advance or retard comparator A23 while leaving comparator A13 unaffected. This is done by joining the signals from the sync amplifier A14 and the balance integrator A31 at the summing node of balance amplifier A21.

The remainder of the circuitry is quite conventional. The secondary contactor system can be operated by 115 volt A.C. from the feeder control or by a simple closure of the pins A and B as shown in FIG. 1. Resistor R10 is used to provide a consistent load for the thyrsistors to fire into when the terminal impedance is high for any reason.

In summary, the described system provides a short time constant current source and a long term regulated constant potential source. This is done with a two regulator systems, one for current and the other for voltage. The voltage regulator loop is relatively slow. Superimposed on this is a current feedback signal. A signal representive of the weld current is developed by the Hall device HD1 and negatively fed back to the main regulator. The result is a power source that can be set to hold a given voltage over a long term, but is basically a constant current source due to the very large square wave inductor Z1. The power source does permit current excursion up and down around a mean value for a short term, but violent short term excursions are considerably attenuated. Thus, the current demands by the wire electrode may go to whatever values are required to burn off the wire which is being fed.

I claim:

1. A controllable power supply for supplying substantially square waves of current to a welding arc, said power supply being a constant current A.C. power source controlled in a constant voltage mode and comprising:
   a single phase, A.C. power source having primary and secondary circuits;
   a thyristor bridge circuit connected in series between said source secondary circuit and said arc and including first and second controllable alternately conducting current paths for supplying current in respective opposite and mutually exclusive polarities to said arc;
   an inductor connected in said current paths such that the arc current supplied from said source flows in the same direction in series through said inductor irrespective of the arc currents; and
   control means for rendering said first and second current paths alternately conducting thereby supplying substantially square waves of current to said welding arc synchronized with said power source, said inductor having sufficient inductance so as to supply an essentially constant current to said arc; said control means including a voltage control feedback loop connected to monitor the arc voltage, compare the arc voltage with a reference voltage, and adjust the times when said first and second current paths are rendered conductive so as to cause said arc voltage to become equal to said reference voltage, and a current feedback loop connected to monitor the arc current and superimpose a negative control signal on the comparison of said arc voltage with said reference voltage, the response time of said voltage feedback loop being insensitive to short instantaneous perturbations whereby the output voltage is regulated in the long term with high gain.

2. The controllable power supply recited in claim 1 wherein said voltage control feedback loop comprises:
   a regulator operational amplifier having a summing function, said reference voltage and said negative control signal being connected to said summing junction; and
   rectifier means for rectifying the voltage across said arc and providing a D.C. voltage proportional thereto to said summing junction, the output of said regulator operational amplifier being by said control means to adjust the times when said first and second current paths are rendered conductive.

3. The controllable power supply recited in claim 2 wherein said current feedback loop comprises:
   a current sensor connected to sense the D.C. current flowing in said inductor and provide a voltage signal proportional thereto;
   an integrating filter having a roll off frequency lower than the supply frequency and connected to receive the voltage signal from said current sensor; and
   a D.C. blocking capacitor connected between said integrating filter and said regulator operational amplifier summing junction.

4. The controllable power supply recited in claim 3 wherein said current sensor comprises a Hall device.

5. The controllable power supply recited in claim 2 wherein said rectifier means comprises:
   a diode bridge connected across said arc;
   voltage dividing means connected to said diode bridge to reduce the full wave rectified voltage from said diode bridge; and
   integrator means for filtering and supplying the reduced voltage from said voltage dividing means to said regulator operational amplifier summing junction.

6. The controllable power supply recited in claim 2 wherein said control means further comprises:

sync means connected to said source for supplying a sync signal displaced in phase from, but synchronized in time with, the source current;

comparator means connected to receive the outputs of said regulator operational amplifier and said sync means for producing pulse outputs timed for rendering said first and second paths conductive so as to cause said arc voltage to become equal to said reference voltage; and pulse amplifier means responsive to the pulse outputs of said comparator means for supplying gating pulses to said thyristor bridge circuit.

7. The controllable power supply recited in claim 3 wherein said current feedback loop further comprises:

a high impedance path connected between said current sensor and the summing junction of said regulator operational amplifier; and current limiting means connected to said current sensor and normally rendering said high impedance path non-conductive but responsive to high overload currents to render said high impedance path conductive.

8. The controllable power supply recited in claim 7 wherein said current limiting means is connected to said current sensor by means of a low pass filter to reduce the sensitivity of said current limiting means to short time current excursions, and said current limiting means also shorts and reference voltage to ground when a high overload current is detected.

9. The controllable power supply as recited in claim 3 further comprising:

current trip means connected to said current sensor for grounding said negative control signal and supplying a high start reference voltage to the summing junction of said regulator operational amplifier during arc start, and, after a predetermined delay, ungrounding said negative control signal and removing said high start reference voltage.

10. The controllable power supply as recited in claim 6 further comprising:

balance detector means connected to said power source primary and secondary circuits for detecting any unbalance in half cycle currents and providing an output feedback signal to said comparator means to thereby automatically adjust the width of alternate half cycles of arc current so as to compensate for any unbalance in primary current draw of said power source on alternate half cycles.

* * * * *